Patented Nov. 2, 1943

2,333,493

UNITED STATES PATENT OFFICE 2,333,493

AZOCYCLIC COMPOUND

George W. Rigby, Wilmington, Del., assignor to E. I. du Pont de Nemours & Company, Wilmington, Del., a corporation of Delaware No Drawing. Application June 11, 1941, Serial No. 397,644

15 Claims. (Cl. 260—296)

This invention relates to a new process for preparing heterocyclic compounds and to new heterocyclic nitrogen compounds prepared thereby.

This invention has as an object the provision of a new process for the preparation of heterocyclic nitrogen compounds. A further object comprises new heterocyclic compounds. Another object is the preparation of new dye intermediates, pharmaceuticals and photographic chemicals. Other objects will appear hereinafter.

These objects are accomplished by the following invention wherein an N-primary acyl-2-cyanoimine having one hydrogen on the 2-carbon (i. e., that bearing the cyano group), having a hydrocarbon substituent on the 1-carbon (i. e., that bearing the imino group) and, preferably, also on the 2-carbon, is intramolecularly condensed by means of a substantially completely hydrolyzable alkali metal condensing agent under anhydrous, non-oxidizing conditions, i. e., in a substantially water and oxygen free medium, to form a 2-hydroxy-4-aminopyridine having a hydrocarbon substituent on the carbon in position 6 and hydrogen or, preferably, a hydrocarbon radical on the carbon in position 5. When the substituents on the carbons in positions 5 and 6 are hydrocarbon, they are preferably joined together to form, with carbons 5 and 6 an alicyclic ring.

In the process of this invention an N-primary acyl-2-cyanoimine (II) which may be obtained from the 2-cyanoimine (I) by acylation is condensed with a substantially completely hydrolyzable alkali metal condensing agent such as sodamide to the substituted 2-hydroxy-4-aminopyridine (III). These reactions may be formulated as follows:

$$R^1-CH \underset{NH}{\overset{C\equiv N}{\underset{\displaystyle R^2-C}{\Big|}}} \xrightarrow{Cl-CO-CH_2R^3}$$

$$R^1-CH \underset{N}{\overset{\displaystyle \underset{C}{\overset{N}{\|}}\underset{R^3}{\diagdown}}{\underset{\displaystyle R^2-C}{\Big|}}} \xrightarrow{} R^1 \underset{\displaystyle R^2}{\overset{\displaystyle 4}{\underset{\displaystyle 6}{\underset{\displaystyle N}{\Big\langle}}}} \underset{\displaystyle OH}{\overset{\displaystyle R^3}{\Big\rangle}}$$

II   III

The N primary acyl-2-cyanoimine may be obtained by treatment of a 2-cyanoimine with a primary acylating agent under anhydrous conditions in the following manner:

To a solution of the 2-cyanoimine in 2-20 parts of an inert anhydrous solvent such as dioxane at a temperature of 20–30° C. is added a slight excess of an anhydrous proton acceptor (Chemical Reviews 5, 231–38 (1928)), e. g. pyridine. To the stirred solution there is added gradually 1 molar equivalent of a primary acyl chloride, i. e., an acyl chloride wherein the —CO—Cl group is attached to a carbon bearing at least two hydrogens. This is usually attended by a spontaneous rise in temperature to about 50° C. After stirring 1–2 hours, the solution is poured onto ice and the acylated 2-cyanoimine isolated by filtration or extraction followed by suitable purification such as fractional distillation, crystallization or solvent extraction. An alternative procedure is to cover the 2-cyanoimine with 4–10 equivalents of an acid anhydride, heat until a clear solution is obtained, and set aside to cool at room temperature for 12–15 hours, when a crystalline product usually appears which is isolated by distillation or crystallization.

In the second step, the condensation of an acylated 2-cyanoimine (II) to form a substituted 2-hydroxy-4-aminopyridine (III) is effected by treatment with sodamide or other completely hydrolyzable alkali metal condensing agent. To a suspension of 2.5 molar equivalents of sodamide in liquid ammonia at atmospheric pressure in a reactor equipped with a mechanical stirrer is added slowly in the course of 0.5–1.0 hour one molar equivalent of the acylated 2-cyanoimine. The reaction is vigorous, and is usually accompanied by the evolution of heat. The temperature remains at the boiling point of liquid ammonia as the result thereof. Addition of the acylated 2-cyanoimine usually causes a color change from gray-black to yellow to grayish-white or from gray-black to gray-green or maroon. The original ammonia level is maintained by frequent additions, and stirring is continued for 2–5 hours after which the reaction mixture is cautiously decomposed by addition of three molar equivalents of ammonium chloride. Stirring is then discontinued and the ammonia allowed to evaporate spontaneously. The residual solid is heated to boiling with 2–5 parts of water to decompose sodium compounds and remove excess ammonia, cooled and filtered. The solid pyridine derivative (III) is usually recrystallized from water or acetic acid after decolorization with activated charcoal. The 2-hydroxy-4-aminopyridines thus obtained are usually fairly high melting solids soluble in polar solvents such as water and acetic acid and insoluble in nonpolar solvents such as benzene. Those 2-hydroxy-4-aminopyridine derivatives in which $R^3$ is hydrogen are very reactive and may be substituted in the 3-position by diazo, halogen, nitro, nitroso, acyl, sulfonic acid groups, and the like. These substitutions are effected by orthodox procedures effective for reaction with aromatic compounds in general, but in such cases as nitration and sulfonation it is necessary to protect the sensitive amino and hydroxyl groups as by acylation or formation of ethers. The hydroxyl and amino groups can be acylated to introduce desired substituents.

The 2-cyanoimines used in the preparation of the acyl intermediates of the process of this invention may conveniently be prepared by condensation of nitriles by alkali metal amides (K. Ziegler, H. Eberle, and H. Ohlinger, Ann. 504, 94 (1933)) which is a modification of the Thorpe reaction (J. Chem. Soc. 95, 1903 (1909)).

A new method for the preparation of 2-cyanoimines using alkali metal-hydrocarbon compounds is described in copending application Serial No. 338,228, filed May 31, 1940 by Frank Kerr Signaigo.

All materials used in the process of this invention should be substantially anhydrous. With this precaution any good commercial grade is satisfactory.

The more detailed practice of the invention is illustrated by the following examples, wherein parts given are by weight. There are of course many forms of the invention other than these specific embodiments. The Roman numerals used after the names of compounds refer to the structural formulae.

*Example I*

In this example, 2-cyanocyclopentylidenimine obtained by cyclization of adiponitrile is acetylated at elevated temperature and cyclized with sodamide in an inert solvent under anhydrous nonoxidizing conditions.

A mixture of five parts of 2-cyanocyclopentylidenimine and 50 parts of acetic anhydride is refluxed for two hours, concentrated to about ⅓ the original volume and cooled. The filtered crystalline product is then washed with a benzene-petroleum ether mixture, yielding white needles of N-acetyl-2-cyanocyclopentylidenimine (IV), M. P. 125–126° C. and containing 18.55% nitrogen. The nitrogen content calculated for N-acetyl-2-cyanocyclopentylidenimine, $C_8H_{10}N_2O$, is 18.65%. Saponification of this material with 10% aqueous sodium hydroxide yields 2-cyanocyclopentylidenimine, M. P. 148° C.

To effect cyclization a mixture of five parts of N-acetyl-2-cyanocyclopentylidenimine, five parts of sodamide, and 115 parts of paraffin is slowly heated in a closed reaction vessel with stirring to about 200° C. The mixture darkens with evolution of some ammonia, is cooled to 100° C., and filtered. The black solid is further washed with petroleum ether and extracted with several portions of boiling benzene. On concentration there are obtained white crystals, M. P. 319° C. which, after recrystallization from water melt at 323° C.

The yield of crude 2-hydroxy-4-amino-5,6-dihydropyrindine (V) is 64% of the theoretical

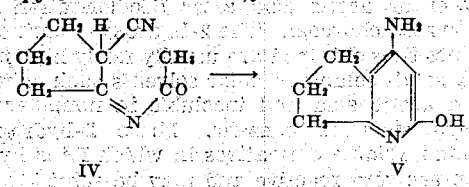

IV V

The compound analyses for 64.10% carbon, 6.74% hydrogen, and 18.69% nitrogen. The calculated percentages for 2-hydroxy-4-amino-5,6-dihydropyrindine are: carbon, 64.0%; nitrogen, 18.70%; hydrogen, 6.66%. On treatment with ferric chloride solution, a dark red color is obtained, indicating the presence of a phenolic group. Two parts of the solid material obtained above heated to boiling with 10 parts of acetic anhydride and let stand 12 hours, after filtration and air drying gives a 92% yield of crystalline 2-acetoxy-4-acetamido-5,6-dihydropyrindine, M. P. 232° C. containing 61.56% carbon, 6.41% hydrogen, 11.84% nitrogen. The calculated percentages for 2-acetoxy-4-acetamido-5,6-dihydropyrindine (VI) are: carbon, 61.1%; hydrogen, 5.98%; nitrogen, 11.95%.

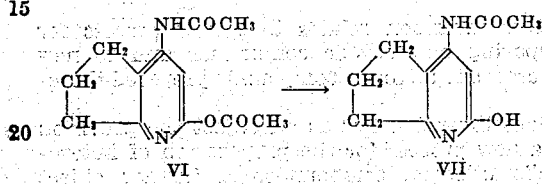

VI VII

A mixture of 2.1 parts of the diacetyl derivative, 20 parts methanol, and 20 parts of methanol saturated with dry ammonia is allowed to stand 20 minutes when the crystals which deposit are filtered and washed with methanol. On drying in the air, there is obtained 1.6 parts of 2-hydroxy-4-acetamido-5,6-dihydropyrindine (VII) M. P. 314° C., yield 94%.

Analysis calculated for $C_{10}H_{12}N_2O_2 \cdot H_2O$: C, 57.2; H, 6.68. Found: C, 57.0; H, 7.2.

*Example II*

This example illustrates the preferred conditions for acetylation with acetic anhydride at moderate temperatures without catalyst and subsequent cyclization at low temperatures with sodamide in liquid ammonia.

A mixture of 100 parts of 2-cyanocyclopentylidenimine and 700 parts of acetic anhydride is heated on a steam bath to yield a clear solution, which is then let stand at room temperature for 12–15 hours, cooled in ice, filtered, and air dried. There is obtained 125.7 parts, (90.6% yield) of N-acetyl-2-cyanocyclopentylidenimine, M. P. 125–126° C. The cyclization to 2-hydroxy-4-amino-5,6-dihydropyrindine is effected as follows:

To a solution of sodamide, corresponding to 114 parts of sodium, in 4000 parts of liquid ammonia, prepared by the method of Vaughn, Vogt and Nieuwland, J. Am. Chem. Soc. 56, 2120–22 (1934), using one part of ferric nitrate enneahydrate, is added during one hour with constant agitation 300 parts of N-acetyl-2-cyanocyclopentylidenimine. The mixture is stirred at the boiling point of liquid ammonia for 3.5 hours, the original ammonia level being maintained by frequent additions of liquid ammonia. The reaction mixture gradually changes in color from dark gray to gray-green to grayish-white. The white product is decomposed by cautious addition of 300 parts of ammonium chloride. The liquid ammonia solution is then allowed to stand 16 hours to evaporate, yielding a grayish-white solid mass which is boiled with 1000 parts of water to destroy sodium compounds and remove excess of ammonia, stirred, cooled, and filtered. The material is recrystallized from 7500 parts of boiling water after decolorization with charcoal, then oven dried at 110–120°. The product, melting at 323° C., is obtained in 94% yield—280.4 parts.

Example III

In this example, 2-cyanocyclohexylidenimine (obtained by treatment of 2-cyanocyclohexanone with ammonia) is converted to the acetyl compound, and without isolation of the product, immediately cyclized to 2-hydroxy-4-amino-5,6,7,8-tetrahydroquinoline.

A mixture of 117 parts of 2-cyanocyclohexylidenimine and 1000 parts of acetic anhydride is allowed to stand at room temperature for 72 hours when the excess acetic anhydride is removed under diminished pressure. The acetyl compound is then slowly added to a solution of 250 parts of finely divided sodamide, prepared as in Example II, in 5000 parts of liquid ammonia in the course of 30 minutes. After stirring for 4 hours in liquid ammonia according to the above described procedure, the mixture is decomposed by careful addition of 400 parts of dry ammonium chloride, allowed to stand overnight, and taken up in water. After decolorization and concentration, there is obtained a white crystalline solid, M. P. 131° C., containing 65.37% carbon; 7.42% hydrogen; 16.75% nitrogen. The calculated percentages for 2-hydroxy-4-amino-5,6,7,8-tetrahydroquinoline,

(VIII) are: carbon, 65.8%; hydrogen, 7.32%; nitrogen, 17.02%.

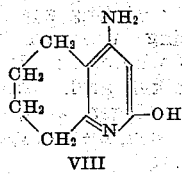

Example IV

This example illustrates the process of this invention as applied to an acylcyanoimine having a longer chain acyl radical, i. e., the methylene group undergoing the condensation reaction contains an alkyl substituent.

A mixture of 1560 parts of propionic anhydride and 216 parts of 2-cyanocyclopentylidenimine is heated to 90–100° C. until a clear solution is obtained and then for an additional period of 1.5 hours. The product is then kept at (35–40° C.) for 48 hours, and the resulting voluminous mass of silky white crystals filtered and washed with naphtha. There is obtained 269 parts, an 82% yield, of N-propionyl-2-cyanocyclopentylidenimine (IX) M. P. 116° C. The product contains 17.7% nitrogen. The nitrogen content calculated for N-propionyl-2-cyanocyclopentylidenimine is 17.1%.

To a suspension of 150 parts of sodamide in 5000 parts of liquid ammonia prepared from 92 parts of metallic sodium as in Example II is added with stirring in the course of 30 minutes, 164 parts of N-propionyl-2-cyanocyclopentylidenimine. The stirring is continued for 5 hours while the ammonia level is maintained and the color changes from gray-black to gray-green to yellow-gray. The product is decomposed with 300 parts of ammonium chloride, boiled with water, and the cold solution filtered. The yield of crude 2-hydroxy-3-methyl-4-amino-5,6-dihydropyrindine is 96% of the theoretical. After recrystallization from water, the white product obtained melts at 287° C. and contains 65.96% carbon and 7.32% hydrogen. The calculated percentages for 2-hydroxy-3-methyl-4-amino-5,6-dihydropyrindine (X) are: carbon, 65.96%; hydrogen, 7.41%.

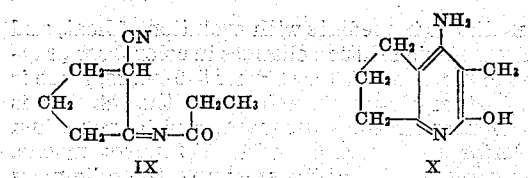

Example V

This example illustrates the acylation of a 2-cyanoimine by heating the imine with an ester, and subsequent cyclization of the acylated cyanoimine in which the methylene group undergoing condensation contains an acyl substituent.

A mixture of 360 parts of 2-cyanocyclopentylidenimine, 450 parts of acetoacetic ester, and 600 parts of toluene is heated to boiling under a fractionating column and ethanol removed as formed. After boiling 6 hours, the yellow solution deposits a solid. Upon cooling and filtering there is obtained 340 parts of N-acetoacetyl-2-cyanocyclopentylidenimine, M. P. 93–94° C., which is recrystallized from benzene by precipitation with petroleum ether.

To a suspension of 240 parts of sodamide in 6000 parts of liquid ammonia prepared as in Example II, there is added 172 parts of N-acetoacetyl-2-cyanocyclopentylidenimine with vigorous stirring during the course of 0.5 hour. Considerable heat evolves during the addition, and the mixture is stirred for 4.5 hours with maintenance of the ammonia level by occasional additions. Finally, the reaction mixture is decomposed by adding 550 parts of ammonium chloride during the course of 0.5 hour. After standing 15 hours, the grayish-white residue is heated with 6000 parts of water with stirring to destroy sodium compounds and drive off excess ammonia. After cooling, the mixture is filtered and the crude product recrystallized from acetic acid. The yield of pure 2-hydroxy-3-acetyl-4-amino-5,6-dihydropyrindine (XI) M. P.>330° C., is 85% of the theoretical. This product contains 14.43% nitrogen. The nitrogen content calculated for 2-hydroxy-3-acetyl-4-amino-5,6-dihydropyrindine is 14.57%.

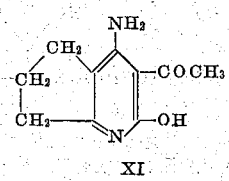

Example VI

This example illustrates acylation of a 2-cyanoimine with an acyl halide and an anhydrous acid acceptor and subsequent condensation involving a methylene group containing a halogen atom.

To a solution of 54 parts of 2-cyanocyclopentylidenimine in 400 parts of dioxane containing 79 parts of pyridine there is added slowly during 2 hours 73 parts of chloroacetyl chloride. The solution changes in color from yellow to red, evolves heat, and deposits a solid. After stirring for 3 hours, the entire mixture is poured onto ice, yielding a solid precipitate. After washing with water, sodium bicarbonate solution, and drying, the brown solid is recrystallized from benzene, yielding N-chloroacetyl-2-cyanocyclopentylidenimine, M.P. 166–167° C. containing 18.7% chlorine. The chlorine content calculated for N-chloroacetyl-2-cyanocyclopentylidenimine is 19.1%.

To a solution of 20 parts of sodamide in 500 parts of liquid ammonia there is added 15 parts of N-chloroacetyl-2-cyanocyclopentylidenimine.

Reaction is immediate with evolution of heat, and the ammonia solution changes in color from gray-red to maroon. After stirring 5-6 hours, there is no further change in color, and the mixture is decomposed in the usual manner with ammonium chloride and covered with 300 parts xylene. After evaporation of the ammonia, the solid mass is stirred under xylene for 0.5 hour with 400 parts of water, and filtered. The yield of crude 2-hydroxy-3-chloro-4-amino-5,6-dihydropyrindine is 14 parts, 92% of the theoretical. This material is changed, on recrystallization from glacial acetic acid, to the acetate, M. P. 324° C. which contains 49.01% carbon, 5.94% hydrogen, 11.85% nitrogen, and 14.32% chlorine. The calculated percentages for 2-hydroxy-3-chloro-4-amino-5,6-dihydropyrindine acetate (XII) are: carbon, 49.01%; hydrogen, 5.3%; nitrogen, 11.85%; chlorine, 14.5%.

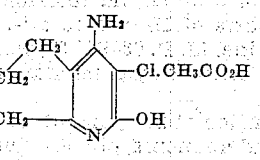

XII

*Example VII*

This example illustrates acylation of a 2-cyanoimine with a dibasic acid chloride and cyclization of the resulting bifunctional compound.

To a mixture of 30 parts of pyridine, 36 parts of 2-cyanocyclopentylidenimine, and 200 parts of dioxane is added during the course of 1.5 hours 31 parts of adipyl chloride. The solution becomes noticeably warmer and a tan solid precipitates. The mixture is then stirred for 3 hours, let stand (18 hours), heated to 90° C. for 1 hour, and poured onto ice. After filtration and washing with water, the solid is dried, yielding 54 parts or 89% of the theory of material. On recrystallization from dioxane, this product melts at 220° C. and contains 16.5% of nitrogen. The nitrogen content calculated for N,N'-bis(2-cyanocyclopentylidene)adipamide (XIII) is 17%.

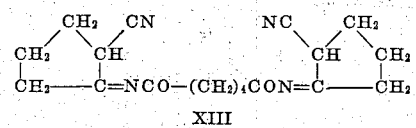

XIII

This material cyclized according to the procedure described in Example II to produce 3,3'-ethylene - bis(2 - hydroxy -4- amino-5,6-dihydropyrindine) (XIV).

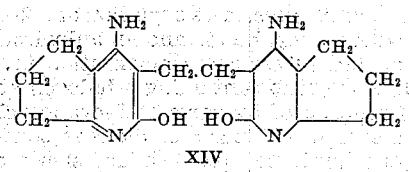

XIV

By similar cyclization of N,N'-bis(2-cyanopentylidene)glutaramide, there is obtained 3,3'-methylene-bis(2-hydroxy-4-amino-5,6 - dihydropyrindine) melting above 360° C. which may be purified by recrystallization from glacial acetic acid to yield a monoacetate melting above 360° C. The diamino compound contains 60.9% carbon, 6.9% hydrogen and 15.1% nitrogen. The calculated values for the monoacetate of $C_{17}H_{20}N_4O_2$ are: carbon, 61.3%; hydrogen, 6.7%; nitrogen, 15.4%.

*Example VIII*

This example illustrates the acylation of an acyclic 2-cyanoketimine and subsequent cyclization to an alkyl pyridine derivative.

A mixture of 20 parts of beta-iminobutyronitrile (diacetonitrile) and 100 parts of acetic anhydride is heated on a steam bath for 1 hour and the acetic anhydride then removed under diminished pressure. The residue solidifies to yield 30 parts of white solid, M. P. 53° C., which is recrystallized from ether-petroleum ether. This compound contains 22.66% nitrogen. The theoretical nitrogen content of N-acetylbeta-iminobutyronitrile is 22.56%.

This compound is cyclized according to the procedure described in Example II to produce 2-hydroxy-4-amino-6-methylpyridine (XV).

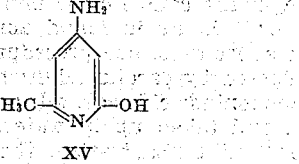

XV

The yield, however, was not good. For this and other reasons, 2-cyanoimines having hydrocarbon on both carbons 1 and 2 are preferred and especially alicyclic 2-cyanoimines.

In the process of this invention an N-primary acyl-2-cyanoimine is condensed. The N-primary acyl-2-cyanoimine may be prepared by the use of any primary acylating agent, i. e., acylating agent introducing the primary acyl group $R^3$—$CH_2$—CO— wherein $R^3$ is hydrogen, alkyl, including cycloalkyl, aryl, aralkyl, heterocyclic, alkoxy, aryloxy, halogen, acyl, including methyl, ethyl, phenyl, benzyl, methoxy, phenoxy, chloroacetyl, benzoyl, etc.

The term primary acyl is used as defined in Bernthsen-Sudborough, Organic Chemistry (1931) page 152 to mean an acyl group having two hydrogens on the alpha carbon.

In the examples, the use of acylating agents such as acid anhydrides, acid chlorides, and esters has been described. However, other acylating agents, e. g., mixed anhydrides, ortho esters, ketenes, imides, or tertiary amides may be employed provided the acylating agent is a primary acylating agent introducing a primary acyl group. In preparing acylated 2-cyanoimines, it is essential to use anhydrous conditions and inert solvents, i. e. such as will not react with the acylating agents employed. Examples of these are: ethers, e. g. diethyl ether, dimethyl ether of ethylene glycol, and dioxane; hydrocarbon solvents, e. g. benzene, xylene, and ligroin; chlorinated solvents, e. g. carbon tetrachloride, dichloroethylene, and chlorobenzene; tertiary amines, e. g. pyridine, dimethylaniline, and trimethylamine.

The process of this invention is applicable to the N-primary acyl derivatives of other 2-cyanoimines in addition to those already described. Any 2-cyanoimine having a hydrogen on the imino nitrogen and on the carbon bearing the cyano group and having a hydrocarbon substituent on the carbon bearing the imino group and preferably also on that bearing the cyano group may be acylated with a primary acylating agent and then cyclized according to the process of this invention. Alicyclic 2-cyanoimines are preferred.

The N-primary acyl 2-cyanoimines which may be cyclized in the process of this invention have the formula

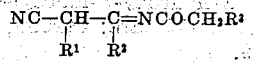

wherein $R^2$ is a hydrocarbon radical and $R^1$ is selected from the class consisting of hydrogen and hydrocarbon radicals. When $R^1$ and $R^2$ are combined, they form with the 1 and 2 carbons an alicyclic ring as in the N-acetyl-2-cyanocyclopentylidenimine of Example I. When $R^1$ and/or $R^2$ are hydrocarbon, they may be alkyl, alkenyl, aryl, or alicyclic. Suitable open chain aliphatic cyanoimines in addition to those disclosed in the examples include 2-cyano-3-iminopentane (dipropionitrile), 3-cyano-4-iminoheptane (dibutyronitrile), 4-cyano-5-iminononane (divaleronitrile), 11-cyano-12-imino-tricosane (dilauronitrile), 17-cyano-18-iminopentatriacontane (distearonitrile), etc. Suitable alicyclic 2-cyanoimines includes 2-cyanocyclopentylidenimine, 2-cyanocyclohexylidenimine, 2-cyanocycloheptylidenimine, 2-cyanocyclopentadecylidenimine, 2-cyanocycloheptadecylidenimine, etc. Suitable aromatic substituted 2-cyanoimines include 1,2-diphenyl-1-cyano-2-iminoethane and 1,3-diphenyl-1-cyano-2-iminopropane.

In some of the foregoing examples, pyridine was used as an acid acceptor. In those cases where acid acceptors are necessary, i. e., when acylating with an acid halide, it is essential to use anhydrous acid acceptors which do not liberate water for, in the presence of water, acids hydrolyze cyanoimines to ammonia and cyanoketones. Effective acid acceptors include tertiary amines such as pyridine, dimethylaniline, triethylamine, which contain no active amino hydrogen atom to react with the acylating agent. These acid acceptors may be used in conjunction with another solvent or those which are liquids may be used as the sole solvent for the reaction.

As in certain of the foregoing examples, the process of this invention is conveniently carried out by adding the acylating agent to the cyanoimine either in solution or alone. Other modes of bringing the two reactants into contact, however, are also effective. For example, the cyanoimine and the acylating agent may be run simultaneously into a mutual solvent or the cyanoimine may be run into the acylating agent which is dissolved in a solvent which may also contain the acid acceptor. It is preferable that the reaction mixture be stirred while the reactants are brought into contact.

The relative ratio of reactants varies within wide limits. When acid chlorides are employed, most successful results are obtained by the use of about 1 mole for each mole of imino group and simultaneous use of 1-3 moles of acid acceptor. In the case of acid anhydrides and esters, it is usually preferable to use a larger excess, preferably from 2-20 moles per equivalent of imino group. The amount of solvent employed ranges from 1-20 times the weight of cyanoimine, and is usually determined by solubility of the starting material and the product.

The acylation may be carried out at temperatures ranging from $-10$ to $+150°$ C. At temperatures below $-10°$ C. little acylation occurs, or, if it does occur, the rate is exceedingly slow. At temperatures above $+150°$ C. decomposition reactions or side reactions usually set in so that it is preferable to operate below this temperature. In general, temperatures ranging from 10–100° C. are very satisfactory for the acylations.

In the examples, the condensation of acylated cyanoimines to pyridine derivatives is effected by the use of sodamide. Other completely hydrolyzable alkali metal condensing agents may be used, including alkali metal amides such as sodium diethylamide and sodium methylanilide; organo-metallic compounds of the alkali metals such as butyllithium, naphthylsodium, flourylsodium, etc. The condensation reaction may be effected in the presence of any inert solvent, i. e. one which does not react with the alkali or alkaline earth metal compound or the acylated cyanoimine including, in addition to the liquid ammonia and paraffin previously mentioned, hydrocarbon solvents such as benzene, toluene, and xylene; ethers such as diethyl ether, methyl ethyl ether, the dimethyl and diethyl ethers of ethylene glycol, and the like.

The process of this invention is applicable to the condensation of any N-primary acylated 2-cyanoimine having a hydrogen atom on the 2-carbon, i. e. on the carbon bearing the cyano group and a hydrocarbon radical on the 1-carbon and, preferably, also on the 2-carbon, to the corresponding 2-hydroxy-4-aminopyridine. The nature of the cyanoimine and the acyl radicals determines the structure of the pyridine derivative obtained. For example, on consideration of the reaction:

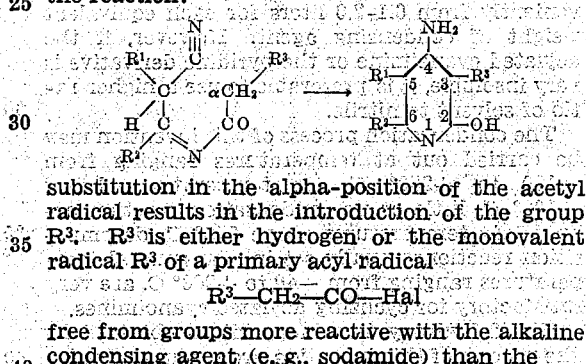

substitution in the alpha-position of the acetyl radical results in the introduction of the group $R^3$. $R^3$ is either hydrogen or the monovalent radical $R^3$ of a primary acyl radical $$R^3-CH_2-CO-Hal$$

free from groups more reactive with the alkaline condensing agent (e. g., sodamide) than the $$-CH_2-CO-$$

group of said acyl radical. This invention is thus applicable to the condensation of acylated cyanoimines in which the radical $R^3$ of the acyl group $R^3-CH_2-CO-Hal$ can be halogen, hydrogen, alkyl, aryl, aralkyl, cycloalkyl, hydrocarbon interrupted by ether oxygen or thioether sulfur (e. g., alkoxyl or aroxyl), hydroxyl, amino, acetyl, aroyl, mercapto, etc.

A group containing active hydrogen such as an amino, hydroxyl, or sulfhydryl group may be introduced by having such a group in posse in the acylating agent, but masked, e. g., by acylation during the acylation of the cyanoimine and even during the condensation but unmasked by hydrolysis after cyclization. It is not necessary (and sometimes not possible) for these substituents to be in the acyl radical at the time of its reaction with the cyanoimine. For example, the mercapto or hydroxyl groups may, after acylation, be introduced in the acyl radical if the latter contains a halogen atom, capable of reacting with an alkali hydrosulfide or an alkali hydroxide, respectively. On the other hand, an acyl group containing an amino group may be introduced directly, for example, by means of the Bergmann synthesis (Whitmore, Organic Chemistry, page 605), using $C_6H_5CH_2OCONHCH_2COCl$ as the acylating agent, then removing the carbobenzoxy group by mild hydrogenation with palladium as catalyst.

In any of the above cases in which the functional substituent contains an active hydrogen atom, one equivalent of alkali metal in sodamide may be used up by formation of the sodium derivative, and a correspondingly larger amount of the sodamide will then be necessary. On hydrolysis of the product, the original functional group will be regenerated from the sodium salt.

As indicated in some of the foregoing examples, the process of the invention is conveniently carried out by first preparing a suspension of the condensing agent and then adding the acylated cyanoimine thereto. Other modes of bringing the two reactants into contact, however, are also effective. Thus the acylated cyanoimine and the suspension of sodamide may be run simultaneously into a suitable inert solvent or a suspension of sodamide may be run onto the acylated cyanoimine or a solution thereof in a suitable solvent.

The relative ratio of reactants employed is preferably 1 to 4 atoms of alkali metal in the form of an amide or hydrocarbon addition product for each equivalent of acylated cyanoimine. However, as indicated above, if certain other functional groups such as the hydroxyl are present, an additional amount of alkali metal may be necessary. The amount of solvent used is conveniently from 0.1–2.0 liters for each equivalent weight of condensing agent. However, if the acylated cyanoimine or the pyridine derivative is very insoluble, it is preferable to use a higher ratio of solvent to nitrile.

The condensation process of this invention may be carried out at temperatures ranging from −100 to +250° C. At temperatures below −100° C. little or no condensation reaction occurs. At temperatures above 250° C. decomposition reactions usually set in. In general temperatures ranging from −40 to +200° C. are very satisfactory for cyclizing acylated cyanoimines.

The 2-hydroxy-4-aminopyridines obtained by the process of this invention are useful as dye intermediates and photographic chemicals. In addition, certain of their derivatives such as 2-hydroxy-3,4-diamino-5,6-dihydropyrindine and 2-hydroxy-4-amino-3-sulfamido-5,6-dihydropyrindine are of interest in these fields and as pharmaceutical chemicals.

The above description and examples are intended to be illustrative only. Any modification of or variation therefrom which conforms to the spirit of the invention is intended to be included within the scope of the claims.

What is claimed is:

1. A 2-hydroxy-4-aminopyridine having hydrocarbon substituents on carbons 5 and 6.

2. A 2-hydroxy-4-aminopyridine wherein carbons 5 and 6 also form part of an alicyclic ring.

3. A 2-hydroxy-4-aminopyridine having a hydrogen on the 3 carbon and alkyl radicals on the 5 and 6 carbons.

4. A 2-hydroxy-4-aminopyridine having the extra-nuclear valences of the carbons at the 5 and 6 positions satisfied by one aliphatic hydrocarbon radical.

5. 2-hydroxy-4-amino-5,6-dihydropyrindine.

6. 2-hydroxy-4-amino-5,6,7,8-tetrahydroquinoline.

7. Process which comprises condensing an N-acyl-2-cyanoimine having at least two hydrogen on the alpha carbon of the acyl group, a hydrocarbon radical on the 1-carbon and a member of the class consisting of hydrogen and hydrocarbon radicals on the 2-carbon and at least one hydrogen on the 2-carbon by bringing the same in contact, at a temperature within the range −100 to +250° C. under anhydrous non-oxidizing conditions, with an alkali metal condensing agent substantially completely hydrolyzable by water.

8. Process which comprises condensing an N-acetyl-2-cyanoimine having a hydrocarbon radical on the 1-carbon and a member of the class consisting of hydrogen and hydrocarbon radicals on the 2-carbon and at least one hydrogen on the 2-carbon by bringing the same in contact, a temperature within the range −100 to +250° C. under anhydrous non-oxidizing conditions, with an alkali metal condensing agent substantially completely hydrolyzable by water.

9. Process which comprises condensing an N-primary-acyl-2-cyano aliphatic imine having a hydrocarbon radical on the 1-carbon and a member of the class consisting of hydrogen and hydrocarbon radicals on the 2-carbon and at least one hydrogen on the 2-carbon by bringing the same in contact, at a temperature within the range −100 to +250° C. under anhydrous non-oxidizing conditions, with an alkali metal condensing agent substantially completely hydrolyzable by water.

10. Process which comprises condensing an N-primary-acyl-2-cyano alicyclic imine, having the 1 and 2 carbons joined by an aliphatic hydrocarbon chain and having one hydrogen on the 2-carbon, by bringing the same in contact, at a temperature within the range −100 to +250° C. under anhydrous non-oxidizing conditions, with an alkali metal condensing agent substantially completely hydrolyzable by water.

11. Process which comprises condensing an N-primary-acyl-2-cyanocyclopentylidenimine having a hydrogen on the 2-carbon, by bringing the same in contact with sodamide at a temperature within the range −100 to +250° C. under anhydrous non-oxidizing conditions.

12. Process which comprises condensing an N-acetyl-2-cyanocyclopentylidenimine having a hydrogen on the 2-carbon, by bringing the same in contact with sodamide at a temperature within the range −100 to +250° C. under anhydrous non-oxidizing conditions.

13. Process which comprises condensing an N-primary-acyl-2-cyanocyclohexylidenimine having a hydrogen on the 2-carbon, by bringing the same in contact with sodamide at a temperature within the range −100 to +250° C. under anhydrous non-oxidizing conditions.

14. Process which comprises condensing an N-acetyl-2-cyanocyclohexylidenimine having a hydrogen on the 2-carbon, by bringing the same in contact with sodamide at a temperature within the range −100 to +250° C. under anhydrous non-oxidizing conditions.

15. Process which comprises acylating, with a primary acylating agent, a 2-cyanoimine having a hydrogen on the imino nitrogen, a hydrocarbon radical on the 1-carbon and, on the 2-carbon, a member of the group consisting of hydrogen and hydrocarbon radicals, and condensing the N-primary-acyl-2-cyanoimine by bringing the same in contact with sodamide at −100 to +250° C.

GEORGE W. RIGBY.

CERTIFICATE OF CORRECTION.

November 2, 1943.

Patent No. 2,333,493.

GEORGE W. RIGBY.

It is hereby certified that error appears in the printed specification of the above numbered patent requiring correction as follows: Page 1, second column, line 21, for "of" read --or--; page 6, first column, claim 7, line 68-69, for "hydrogen" read --hydrogens--; and that the said Letters Patent should be read with this correction therein that the same may conform to the record of the case in the Patent Office.

Signed and sealed this 4th day of January, A. D. 1944.

Henry Van Arsdale,
Acting Commissioner of Patents.

(Seal)